United States Patent Office 3,546,159
Patented Dec. 8, 1970

3,546,159
METHOD FOR THE REDUCTION OF PHOTO-CHEMICAL DEGRADATION IN POLYMERIC MATERIALS
Albert Thomas Betts, Waltham Abbey, and Norbert Uri, Southgate, England, assignors to National Research Development Corporation, London, England
No Drawing. Filed July 12, 1967, Ser. No. 652,698
Claims priority, application Great Britain, July 12, 1966, 31,155/66
Int. Cl. C08g 51/56
U.S. Cl. 260—45.7                                  7 Claims

ABSTRACT OF THE DISCLOSURE

Polar polymers, particularly polyamides, are given improved photochemical stability by the incorporation therein of a small proportion of a soluble alkali metal fluoride.

---

The invention relates to methods of reducing the photochemical degradation of polymeric materials.

It is well known that many organic polymeric materials are degraded photochemically in the atmosphere by exposure to daylight and, to an even greater extent, by exposure to near ultra-violet radiation as found in sunlight. Such degradation may cause embrittlement, discolouration, loss of strength, and other reductions in the desirable properties of the polymeric materials which results in a serious shortening of their serviceable life.

The present invention provides means by which the photochemical degradation of polymeric materials containing polar groups, and particularly of polyamides, may be reduced or substantially inhibited.

According to the invention, a process for reducing the photochemical degradation of a polymeric material comprises incorporating into the polymeric material at least about 0.01% by weight of dissolved alkali metal fluoride which is soluble in the polymeric material, whereby the fluoride anions of said alkali metal fluoride combine with heavy metals present in the polymeric material and reduce the ability of said heavy metals to initiate photochemical degradation of said polymeric material.

The polymeric materials to which the present invention may be applied include polar polymers which are particularly susceptible to photochemical degradation such as polyethers, polyurethanes, polycarbonates and polyamides. Alkali metal fluorides which are soluble in these polymeric materials are sodium, potassium, rubidium and caesium fluorides. Of these, sodium fluoride is the least soluble and therefore the least effective of these named alkali metal fluorides. Lithium fluoride is insufficiently soluble for the purpose of the present invention.

It should be understood that fluorides are classified as soluble for the purposes of the present invention if they are soluble in the polymeric material to the extent of about 0.01% by weight.

The alkali metal fluoride may be incorporated during the manufacture of the polymeric material or subsequently.

Where the polymeric material is readily soluble it is convenient to introduce an appropriate proportion of the polymer-soluble alkali metal fluoride into a solution of the polymeric material and thereafter isolate the polymeric material incorporating the fluoride.

Alternatively, where the polymeric material is not soluble the soluble alkali metal fluoride may be dissolved directly in a melt of the polymeric material.

As a further alternative, the soluble alkali metal fluoride may be incorporated in one or more precursors of the polymeric material before the polymer is formed.

The basis of the invention lies in our discovery that photochemical degradation in a polymeric material such as a polyamide is frequently due to the presence in the material of small concentrations of heavy metals particularly iron and titanium which can lead to photo-sensitised formation of free radicals leading to an autoxidation reaction and consequent degradation of the polymeric material. Such a heavy metal catalysed autoxidation would absorb only a very small proportion of incident light and may well account for the observation that photochemical degradation of certain polymeric materials can take place apparently without significant absorption of incident light and thus seem to contravene the law of photochemical equivalence.

Alkali metal fluorides incorporated in polymeric materials in accordance with the invention act to inhibit the heavy metal catalysed autoxidation by forming a stable chelate compound with the heavy metal. The high electron affinity of the fluoride ion leads to a higher energy requirement and therefore lower wavelengths for formation of atoms and free radicals by photoexcited (either primary or secondary) electron transfer involving the chelated heavy metal. The effect of the fluoride is therefore to lower the wavelength of the radiation necessary to excite this type of electron transfer and free radical formation to wavelengths outside the range of the prevalent near ultraviolet radiation of bright daylight or even sunlight and thus to inhibit the photochemical degradation of polymeric materials exposed to radiation within this wavelength range.

Heavy metals commonly present in polymeric materials are iron and titanium. Iron in the form of ferric acetanylacetonate is in fact used commercially in the manufacture of polyurethanes, which are very unstable photochemically. Titanium dioxide is used as a de-lustrant in nylon which is, as a rule, also contaminated by iron.

To ensure chelating of photochemically active heavy metals such as iron, the weight of fluoride ion introduced into the polymeric material should preferably be at least five times the weight of these heavy metals. Typically, the proportion of trace iron in commercially available polyamides may be 10–20 parts per million and it is therefore probable that a safe proportion of fluoride is not less than about 0.01% by weight of the treated polymeric material but for practical purposes higher concentrations might be preferred.

The invention will now be illustrated by the following examples in which the degradation by photo induced autoxidation of polyamide polymers in which a fluoride has been incorporated in accordance with the invention, is compared with untreated, highly purified and deliberately heavy metal contamined, polymers. Where polymer films were used they were cast in an identical manner to give films weighing 0.03 g./sq. cm. and then subjected to irradiation under standardised conditions with light of wavelength of approximately 365 m$\mu$, a wavelength important in sunlight. The extent of photochemical degradation of the sample films was ascertained by measuring the relative viscosity changes of solutions of the films. The course of degradation was also followed and confirmed where possible by measuring oxygen uptake and carboxylic acid formation in the films.

EXAMPLE 1

Purified but not iron-free soluble nylon polymer containing no deliberate additive was dissolved in methyl alcohol and the solution was divided into two parts. Caesium fluoride was added to one part so that its content in relation to dry nylon amounted to 0.6%. Films were cast from both solutions and both resulting films were irradiated in a modified Warburg bath with a light source of two medium pressure Hanovia 500 watt mercury vapour lamps. These lamps were fitted horizontally under the bath, the bottom of which was fitted with silica panels. A filter combination (Chance OX1, QV1) was used to isolate the 365 m$\mu$ band and the incident light intensity falling on the films was estimated by means of chemical actinometry to be $1.6 \times 10^{-4}$ nh.$\nu$/hour. After irradiation for 558 hours the relative viscosity of a 0.5% solution of the nylon film in 90% formic acid at 25° dropped to 1.339 for the irradiated film from 1.423 for the unirradiated film. For the film containing 0.6% caesium fluoride the relative viscosity remained unchanged within the limits of the overall experimental error of approximately ±1% (1.420 before irradiation and 1.417 after irradiation). The protective effect of fluoride was also confirmed by the measurement of a decrease in oxygen uptake and carboxylic acid formation.

EXAMPLE 2

A commercially available methyl methoxy nylon ("Maranyl C109P/D.V.55"; (trademark) I.C.I., Ltd.) was submitted to purification by precipitation from a methyl alcohol solution with dilute sulphuric acid and thoroughly washed with water so that it became iron-free (i.e., containing less than 0.5 p.p.m. of iron). Films were prepared as in Example 1 but deliberate iron contamination in the form of ferric acetyl acetonate (FeAcAc) was introduced into the methyl alcohol solution prior to the casting of all but the control films. Caesium fluoride was introduced by the same method into some of the films. The following table shows the changes in relative viscosity of 1% solutions in 90% formic acid as a result of irradiation which was carried out with light of 365 m$\mu$ wavelength under similar conditions as those described in Example 1, except that the intensity was reduced to $9.5 \times 10^{-5}$ nh.$\nu$/hour and time of irradiation increased to 607 hours.

RELATIVE VISCOSITY OF 1% SOLUTIONS IN 90% FORMIC ACID AT 25° C.

| Sample | Unirradiated films | Irradiated films | Percent decrease * |
|---|---|---|---|
| Iron-free nylon | 2.026 | 1.982 | 2.2 |
| Nylon plus 0.005% FeAcAc | 1.999 | 1.771 | 11.4 |
| Nylon plus 0.01% FeAcAc | 2.011 | 1.721 | 14.4 |
| Nylon plus 0.03% FeAcAc | 2.004 | 1.666 | 16.9 |
| Nylon plus 0.01% FeAcAc plus 0.6% CsF | 1.990 | 1.970 | 1.0 |
| Nylon plus 0.03% FeAcAc plus 0.6% CsF | 1.982 | 1.988 | 0.2 |
| Nylon plus 0.06% FeAcAc plus 0.6% CsF | 1.995 | 1.968 | 1.3 |

* Percentage decreases of less than 2% are within experimental error.

The table illustrates both the photocatalytic effect of very small amounts of iron compounds and the protective effect of soluble alkali metal fluoride in preventing photochemical degradation.

EXAMPLE 3

The procedure described in Example 2 was repeated to produce films of the methyl methoxy nylon containing ferric acetonyl acetonate and either no further additive, caesium fluoride, or potassium fluoride. The following table illustrates that potassium fluoride is as efficient as caesium fluoride as a source of fluoride ions capable of reducing photodegradation.

On a weight percentage basis, potassium fluoride might be superior to caesium fluoride because of its relatively higher fluoride ion content.

RELATIVE VISCOSITY OF 1% SOLUTIONS IN 90% FORMIC ACID AT 25° C.
(Time of irradiation 503 hours with light of 365 m$\mu$ of an intensity of $1.3 \times 10^{-4}$ nh.$\mu$/hour)

| Sample | Unirradiated films | Irradiated films | Percent decrease |
|---|---|---|---|
| Nylon plus 0.01% FeAcAc | 2.061 | 1.771 | 17 |
| Nylon plus 0.01% FeAcAc | 2.086 | 2.039 | 2.3 |
| Nylon plus 0.01% FeAcAc plus 0.3% CsF | 2.048 | 2.007 | 2.0 |
| Nylon plus 0.01% FeAcAc plus 0.1% KF | 2.063 | 2.015 | 2.3 |
| Nylon plus 0.01% FeAcAc plus 0.3% KF | 2.068 | 2.025 | 2.1 |

EXAMPLE 4

Similar discs of nylon 6, 6 were prepared by an injection moulding technique with and without deliberate additives. The following table illustrates the increase in photodegradation produced by ferric chloride and titanium dioxide and the marked reduction in photodegradation achieved by the incorporation of caesium fluoride.

CHANGES IN THE RELATIVE VISCOSITY OF 1% FORMIC ACID SOLUTIONS
(Time of irradiation 478 hours, intensity $1.08 \times 10^{-4}$ nh.$\nu$/hour, thickness of nylon 6,6 discs 0.75 mm.)

| Sample | Relative viscosity Before irradiation | Relative viscosity After irradiation | Changes in relative viscosity | Percent decrease |
|---|---|---|---|---|
| Nylon | 2.171 | 2.153 | −0.018 | 0.8 |
| Nylon plus 0.05% FeCl$_3$ | 2.131 | 2.080 | −0.051 | 2.4 |
| Nylon plus 0.05% FeCl$_3$ plus 0.3% CsF | 2.260 | 2.254 | −0.006 | 0.3 |
| Nylon plus 0.1% TiO$_2$ | 2.270 | 2.157 | −0.113 | 5.0 |
| Nylon plus 0.1% TiO$_2$ plus 0.3% CsF | 2.269 | 2.252 | −0.017 | 0.7 |

Minor variations between apparently identical samples in different examples may be accounted for by the high sensitivity of the viscosity measurement to the water content of the formic acid used. The same batch of formic acid was always used when comparing results before and after irradiation.

We claim:

1. A composition having improved resistance toward photochemical degradation which comprises a polycarbonamide containing recurring amide groups as an integral part of the polymer chain containing at least about 0.1% by weight of a dissolved alkali metal fluoride selected from the group consisting of sodium, potassium, rubidium and caesium fluoride.

2. A composition according to claim 1 wherein said polycarbonamide is methyl-methoxynylon.

3. A composition according to claim 1 wherein said polycarbonamide is nylon 6, 6.

4. A composition having improved resistance toward photochemical degradation which comprises a polycarbonamide containing recurring amide groups as an integral part of the polymer chain and containing at least 0.001% by weight of a heavy metal selected from the group consisting of iron and titanium and at least about 0.01% by weight of a dissolved alkali metal fluoride selected from the group consisting of sodium, potassium, rubidium and caesium fluoride.

5. A composition according to claim 4 wherein the ratio by weight of said dissolved alkali metal to said heavy metal is at least about 5:1.

6. A composition containing a polycarbonamide containing recurring amide groups as an integral part of the polymer chain and at least about ten parts per million of at least one of the heavy metals iron and titanium the improvement comprising the additional presence of at least about 0.01% by weight of at least one dissolved alkali metal fluoride selected from the group consisting of sodium, potassium, rubidium and caesium fluoride whereby said composition has improved resistance to photochemical degradation.

7. A composition according to claim 6 wherein the ratio by weight of said dissolved metal to said heavy metal is at least about 5:1.

References Cited

UNITED STATES PATENTS

| | | | |
|---|---|---|---|
| 3,034,879 | 5/1962 | Spacht | 260—45.9 |
| 3,189,575 | 6/1965 | Horn et al. | 260—45.75 |
| 3,324,078 | 6/1967 | Matsui | 260—45.75 |
| 3,379,875 | 4/1968 | Holoch | 260—45.8 |
| 3,425,986 | 2/1969 | Markert | 260—45.75 |
| 3,019,210 | 1/1962 | Gilles | 260—45.7 |
| 3,021,303 | 2/1962 | Jibben | 260—45.75 |
| 3,274,150 | 9/1966 | Baevsky | 260—45.9 |
| 3,282,885 | 11/1966 | Schwartz et al. | 260—45.7 |
| 3,282,892 | 11/1966 | Griehl et al. | 260—45.75 |
| 3,361,708 | 1/1968 | Mersereau et al. | 260—45.7 |

DONALD E. CZAJA, Primary Examiner

R. A. WHITE, Assistant Examiner